US008676933B2

(12) United States Patent
Hwang et al.

(10) Patent No.: US 8,676,933 B2
(45) Date of Patent: Mar. 18, 2014

(54) NAT TRAVERSAL METHOD IN SESSION INITIAL PROTOCOL

(75) Inventors: Shaw Hwa Hwang, Taipei (TW); Kuan Lin Chen, Taipei (TW); Shun Chieh Chang, Taipei (TW); Chi Jung Huang, Taipei (TW); Li Te Shen, Taipei (TW); Ben Chen Liu, Taipei (TW)

(73) Assignee: National Taipei University of Technology, Taipei (TW)

(*) Notice: Subject to any disclaimer, the term of this patent is extended or adjusted under 35 U.S.C. 154(b) by 1168 days.

(21) Appl. No.: 12/382,261

(22) Filed: Mar. 12, 2009

(65) Prior Publication Data

US 2010/0182995 A1 Jul. 22, 2010

(30) Foreign Application Priority Data

Jan. 21, 2009 (TW) .............................. 98102152 A

(51) Int. Cl.
*G06F 15/16* (2006.01)
*H04B 1/44* (2006.01)
*H04L 12/66* (2006.01)

(52) U.S. Cl.
USPC ............ 709/219; 709/227; 370/282; 370/352

(58) Field of Classification Search
USPC ........................................................ 709/219
See application file for complete search history.

(56) References Cited

U.S. PATENT DOCUMENTS

| 2004/0139228 A1* | 7/2004 | Takeda et al. ................ 709/245 |
| 2005/0201304 A1* | 9/2005 | Olshansky .................... 370/282 |
| 2006/0077959 A1* | 4/2006 | Beckemeyer ................ 370/352 |
| 2008/0013524 A1* | 1/2008 | Hwang et al. ................ 370/352 |
| 2008/0165802 A1* | 7/2008 | Tang ............................. 370/466 |
| 2009/0201802 A1* | 8/2009 | Ye et al. ....................... 370/221 |
| 2012/0207151 A1* | 8/2012 | Alt et al. ...................... 370/354 |

* cited by examiner

*Primary Examiner* — Lynn Feild
*Assistant Examiner* — James Edwards
(74) *Attorney, Agent, or Firm* — Bacon & Thomas, PLLC

(57) ABSTRACT

The present invention provides an NAT (Network Address Translator) traversal method in Session Initiation Protocol (SIP) for solving the problems of SIP in Internet phone (VoIP) under current Internet environment. In other words, the present invention solves the SIP problems caused by NAT (Network Address Translator) that P2P (Peer to Peer) transmission cannot traverse the NAT firewall directly. The major content of the present invention is that the computer conducts multiple registrations before issuing an Invite message in order to detect the rule of the NAT server to assign port number and IP address. Additional commands or parameters beyond the SIP standard are not required for the NAT traversal function. Hence, the capability of SIP for a NAT traversal function is provided without no additional commands or parameters.

1 Claim, 8 Drawing Sheets

NAT TRAVERSAL METHOD IN SESSION INITIAL PROTOCOL

FIELD OF THE INVENTION

The present invention relates to an improvement of the NAT (Network Address Translator) traversal method, and more particularly to an NAT (Network Address Translator) traversal method in Session Initiation Protocol (SIP) for improving the traversal of the SIP speech packets under the NAT firewall.

BACKGROUND OF THE INVENTION

VoIP (Voice over Internet Protocol) is one of the popular communication technology. In VoIP, SIP (Session Initiation Protocol) defined by IETF is the most widely used protocol because of its simple structure, expandability and easy operation.

In the present Internet environment, more and more users install NAT (Network Address Translator) servers, but NAT servers induce the communication failure for P2P (Peer to Peer) applications, an SIP server is therefore needed between the NAT servers.

Referring to FIG. 1, which shows the SIP (Session Initiation Protocol) network environment for VoIP, comprises NAT server 1, NAT server 2 and SIP proxy server 3. SIP proxy server 3 is responsible for conducting SIP, i.e. for registration, forwarding or redirection of the computer 4 and computer 5 (client's terminals).

Computer 4 and computer 5 are under NAT server 1 and NAT server 2 respectively, RTP (Real Time Transport Protocol) packets must be transferred through SIP proxy server 3, P2P (peer to peer) communication between Computer 4 and computer 5 is impossible. When a plurality of client's terminals communicates through SIP proxy server 3, it is apparent that the communication efficiency will be reduced significantly.

SUMMARY OF THE INVENTION

The object of the present invention is to provide a communication method to be applied to SIP and let the users under NAT to traverse the NAT of the opposite side for P2P (peer to peer) communication. This method does not need to modify any Internet protocol, and the simple structure can lower the cost of the VoIP provider significantly.

The NAT (Network Address Translator) traversal method in Session Initiation Protocol (SIP) according to the present invention comprises:

the Session Initiation Protocol (SIP) includes a Detection Session, a CallSetup Session, a Media Session and a Cancel Session, and comprises a first NAT server, a second NAT server and an SIP proxy server, a first computer is under the first NAT server, a second computer is under the second NAT server; the SIP proxy server also performs a function of an RTP (Real Time Transport Protocol) server, the SIP proxy server is responsible for transferring messages, while the RTP server is responsible for transferring speech packets, the method comprises the steps as below:

a. the first computer conducts a plurality of detections before issuing an Invite message in the Detection Session for detecting a rule that the first NAT server assigns a port number;

b. after the plurality of detections the first computer predicts the port number assigned by the first NAT server in accordance with the rule that the first NAT server assigns a port number for transferring speech packets, and an IP of the first NAT server and port number assigned by the first NAT server to the first computer for transferring speech packets are filled into the Invite message;

c. the invite message passes to the SIP proxy server through the first NAT server, the SIP proxy server adds an IP of the RTP server and a port number of the RTP server to the invite message, and then passes the invite message to the second computer through the second NAT server.

d. after the second computer receives the Invite message, the second computer conducts a plurality of detections for detecting a rule that the second NAT server assigns a port number;

e. after the plurality of detections, the second computer predicts the port number assigned by the second NAT server to the second computer for transferring speech packets, and an IP of the second NAT server and port number assigned by the second NAT server to the second computer for transferring speech packets are filled into a 200 OK message;

f. the second computer passes the 200 OK message to the SIP proxy server through the second NAT server, the SIP proxy server adds the IP of the RTP server and the port number of the RTP server to the 200 OK message, and then passes the 200 OK message to the first computer through the first NAT server.

g. after the first computer receives the 200 OK message, returns an ACK message to the second computer, and then enter the Media Session, the first computer passes speech packets to both the second NAT server and the RTP server server through the first NAT server;

h. after the second computer receives the ACK message, the second computer passes speech packets to both the first NAT server and the RTP server through the second NAT server;

i. if the prediction of the port numbers assigned by the first NAT server and the second NAT server to the first computer and the second computer are correct, the speech packets will be transferred directly between the first NAT server and the second NAT server, and stopped to transfer to the SIP proxy server;

j. if the prediction of the port numbers assigned by the first NAT server and the second NAT server to the first computer and the second computer are wrong so that the first computer and the second computer do not receive the speech packets from the second computer and the first computer, the first computer and the second computer will stop the transferring of speech packets directly between the first NAT server and the second NAT server, but transfer the speech packets to the SIP proxy server through the first NAT server and the second NAT server respectively to set up communication by the SIP proxy server.

DETAILED DESCRIPTION OF THE PREFERRED EMBODIMENTS

Introduction to SIP

A message is the basic unit for SIP to set up a speech communication. The message can be classified to a "request" and a "response". A request is an SIP message from a client to a server to express the purpose of the client; while a response is an SIP message from a server to a client to answer the request from the client.

SIP defines six request methods, including Invite、Cancel 、Bye、ACK、Register and Option, as shown in table 1 below.

TABLE 1

Six basic requests in SIP

| requests | descriptions |
|---|---|
| Invite | To set up a new media session, or to alter the media characteristics of the present session (re-Invite); a message body often accompanies with the Invite request for describing/altering the media characteristics of the Invite. |
| Cancel | To cancel a session that is not set up yet (the final response is not received) to a server, and the server is under searching or ringing status. |
| Bye | To end up a successful session (the final response "2xx" has been received). A request terminal for Invite or a receiving terminal can issue such request. |
| ACK | A request that the client (issuing an Invite) confirms to the server that a final response is received. |
| Register | SIP client issues a registering request to a server, and the server records the IP address and communication port of the client. |
| Option | Inquiring the support ability of the opposite side. |

An SIP response is a message from a server to a client to answer the request from the client, as shown in table 2 below.

TABLE 2

Classification of SIP responses

| code range | responses | descriptions |
|---|---|---|
| 100~199 (1xx) | Informational | The server has received a request, and the request is processed, but the request is not accepted yet. |
| 200~299 (2xx) | Success | The server accepts the request from the client. |
| 300~399 (3xx) | Redirection | The request message has to be redirected to another server, and the URL of the redirected server will be shown on the header of "Contact". |
| 400~499 (4xx) | Client Error | The request cannot be processed because of the fault of the client, such as the message is not identified, the media is not supported or no such person, . . . etc. According to the instructions from the response meassage, the client can issue a new request to retry. |
| 500~599 (5xx) | Server Error | The request message cannot be processed because of the fault of the server, but the client can issue the request message to other server for processing. |
| 600~699 (6xx) | Global Error | The request message cannot be processed because of the fault of the Internet environment, and the request |

TABLE 2-continued

Classification of SIP responses

| code range | responses | descriptions |
|---|---|---|
| | | message cannot be issued to other server for retry. |

An Example for NAT Communication

Figure 1:
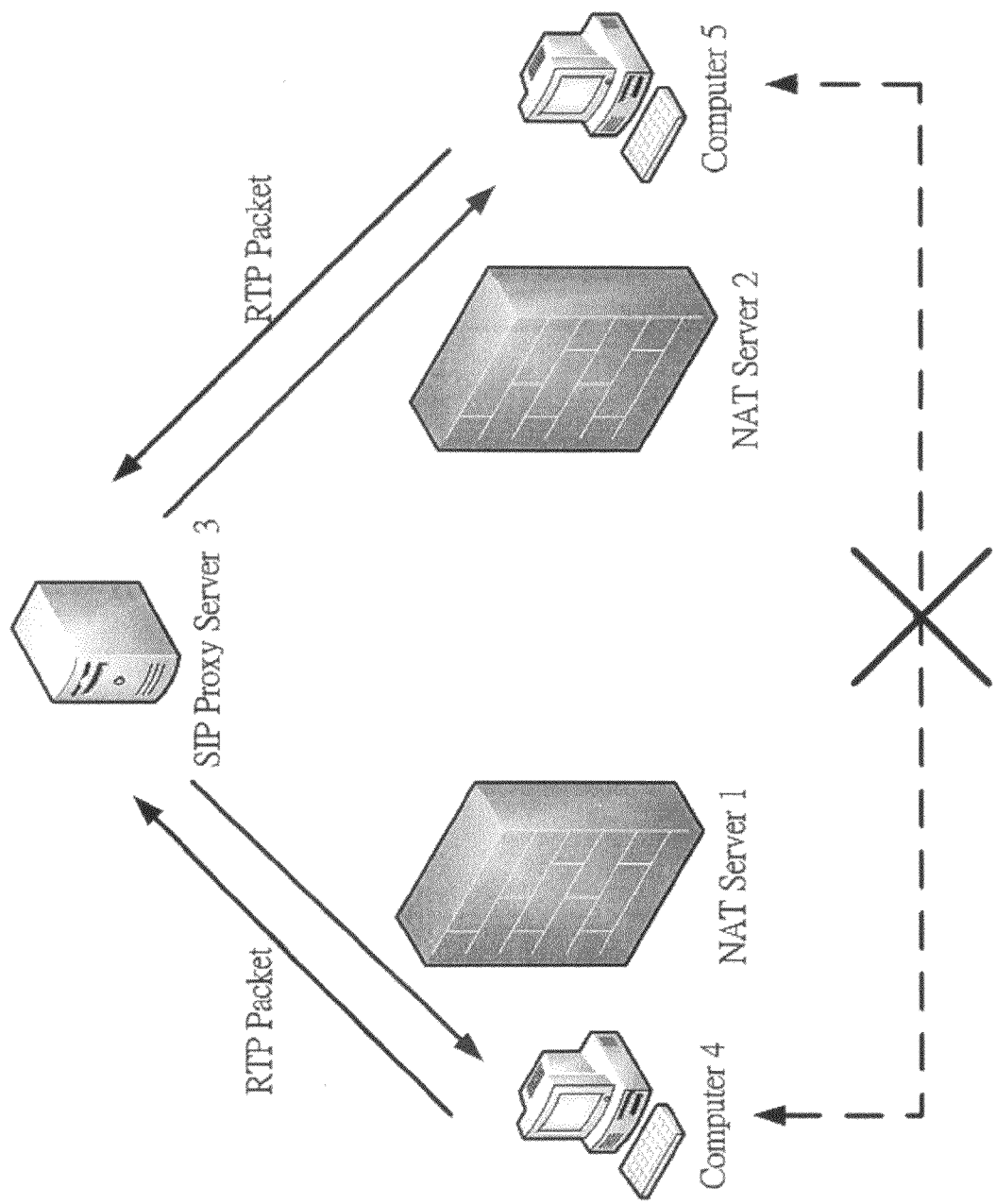
FIG. 1 shows the SIP (Session Initiation Protocol) network environment for VoIP.
Figure 2:
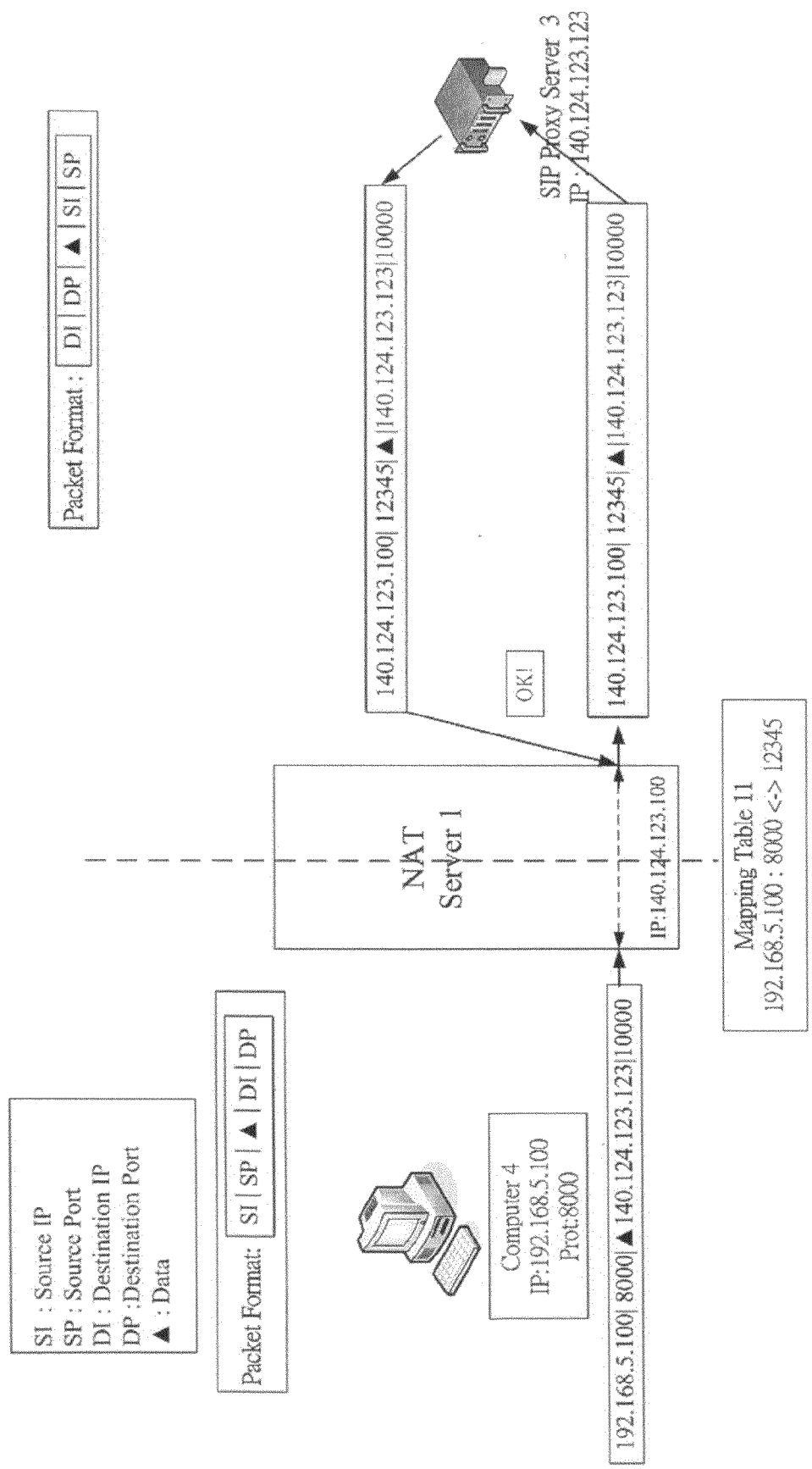
FIG. 2 shows an NAT communication.

Referring to FIG. 2, an NAT communication is described. NAT server 1 is located between SIP proxy server 3 and computer 4 for changing the IP address and port number in speech packets. As the speech packets are transferred from computer 4 to SIP proxy server 3, NAT server 1 will modify the IP address and port number in speech packets.

At the upper left corner of FIG. 2, the form of a speech packet is shown as:

| SI | SP | ▲ | DI | DP |, in which SI is the source IP address, SP is the source port number, ▲ is the data, DI is the destination IP address, DP is the destination port number. At the lower left corner of FIG. 2, the IP address of computer 4 is shown as 192.168.5.100, the port number is 8000. Computer 4 transfers the speech packet thereof to NAT server 1, the from of the speech packet is

| 192.168.5.100 | 8000 | ▲ | 140.124.123.123 | 10000 |, in which 140.124.123.123 is the IP address of SIP proxy server 3, 10000 is the port number of SIP proxy server 3. When the speech packet

| 192.168.5.100 | 8000 | ▲ | 140.124.123.123 | 10000 | passes through NAT server 1, NAT server 1 changes the speech packet into

| 140.124.123.100 | 12345 | ▲ | 140.124.123.123 | 10000 |, in which 140.124.123.100 is the IP address of NAT server 1, 12345 is set by a mapping table 11 in NAT server 1, i.e. change the port number 8000 of computer 4 into the port number 12345 of NAT server 1. After the speech packet arrives SIP proxy server 3, SIP proxy server 3 will return a message to express the speech packet is received (OK! means "received"), the message is

| 140.124.123.100 | 12345 | ▲ | 140.124.123.123 | 10000 |, as shown in FIG. 2.

Introduction of the Session Initiation Protocol (SIP)

Figure 3:
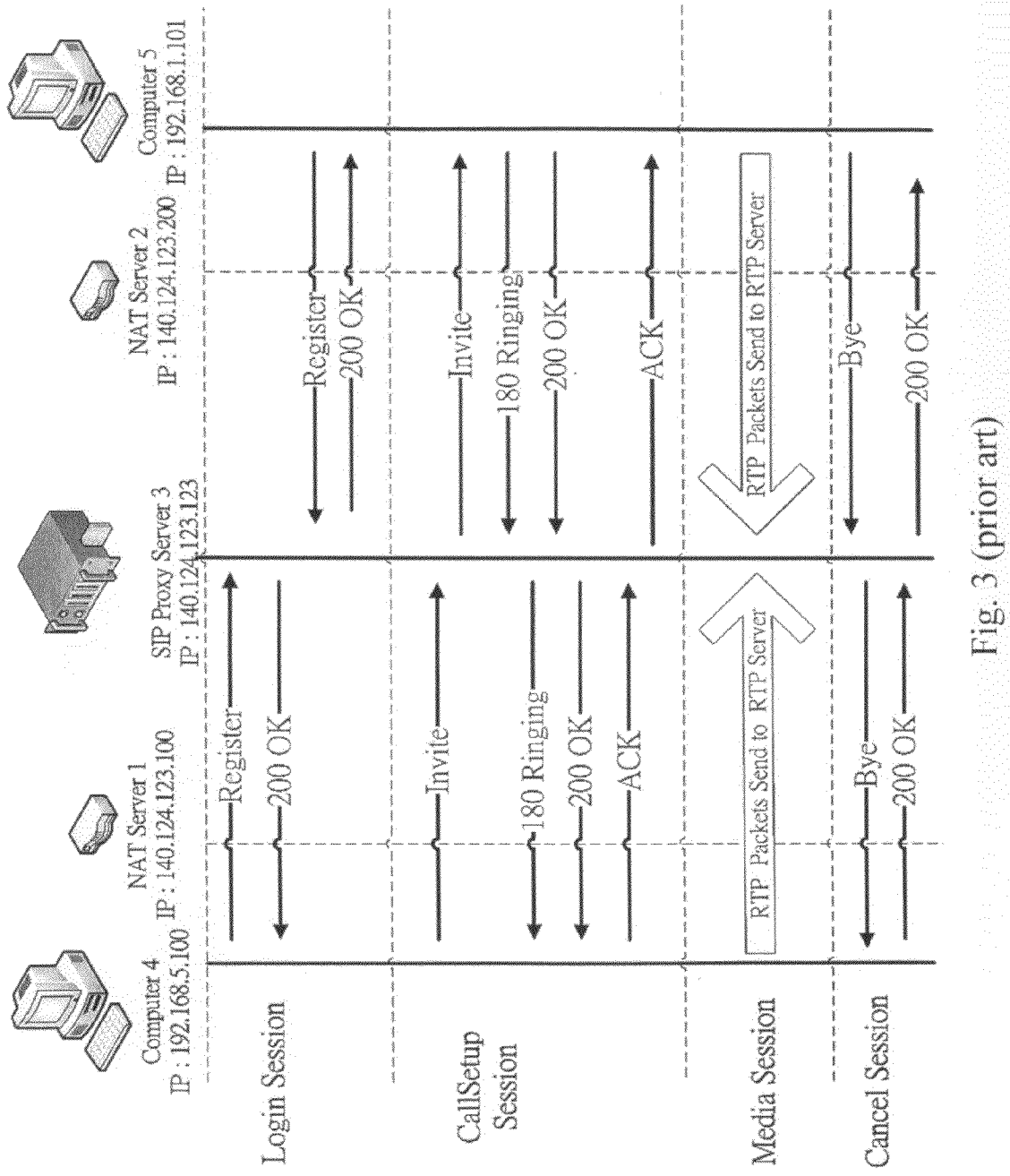
FIG. 3 shows the four sessions in SIP protocol.

Referring to FIG. 3, the Session Initiation Protocol (SIP) includes Login Session, CallSetup Session, Media Session and Cancel Session. The computer 4 passes messages through NAT server 1 to the SIP proxy server 3, and then the SIP proxy server 3 passes messages through NAT server 2 to the computer 5.

The first session is Login Session (also referred to as "Detection Session" in this invention), the computer 4 registers at the SIP proxy server 3, the SIP proxy server 3 will return with 200 OK message to mean success, then the computer 5 registers at the SIP proxy server 3, and will also return with 200 OK message to mean success.

The next session is CallSetup Session, the computer 4 issues Invite message to pass through the SIP proxy server 3 and reach the computer 5, resulting 180 Ringing and 200 OK messages to be transferred back to the computer 4, the computer 4 issues ACK to the computer 5.

Thereafter the computer 4 and the computer 5 will conduct communication (RTP Voice) through SIP proxy server 3.

After the communication is ended, the computer 5 and the computer 4 will issue BYE and 200 OK messages through the SIP proxy server 3 to stop communication.

In FIG. 3, the SIP proxy server 3 also performs the function of RTP (Real Time Transport Protocol) server. SIP proxy server 3 is usually responsible for transferring messages, while RTP server is responsible for transferring speech packets.

Figure 4:
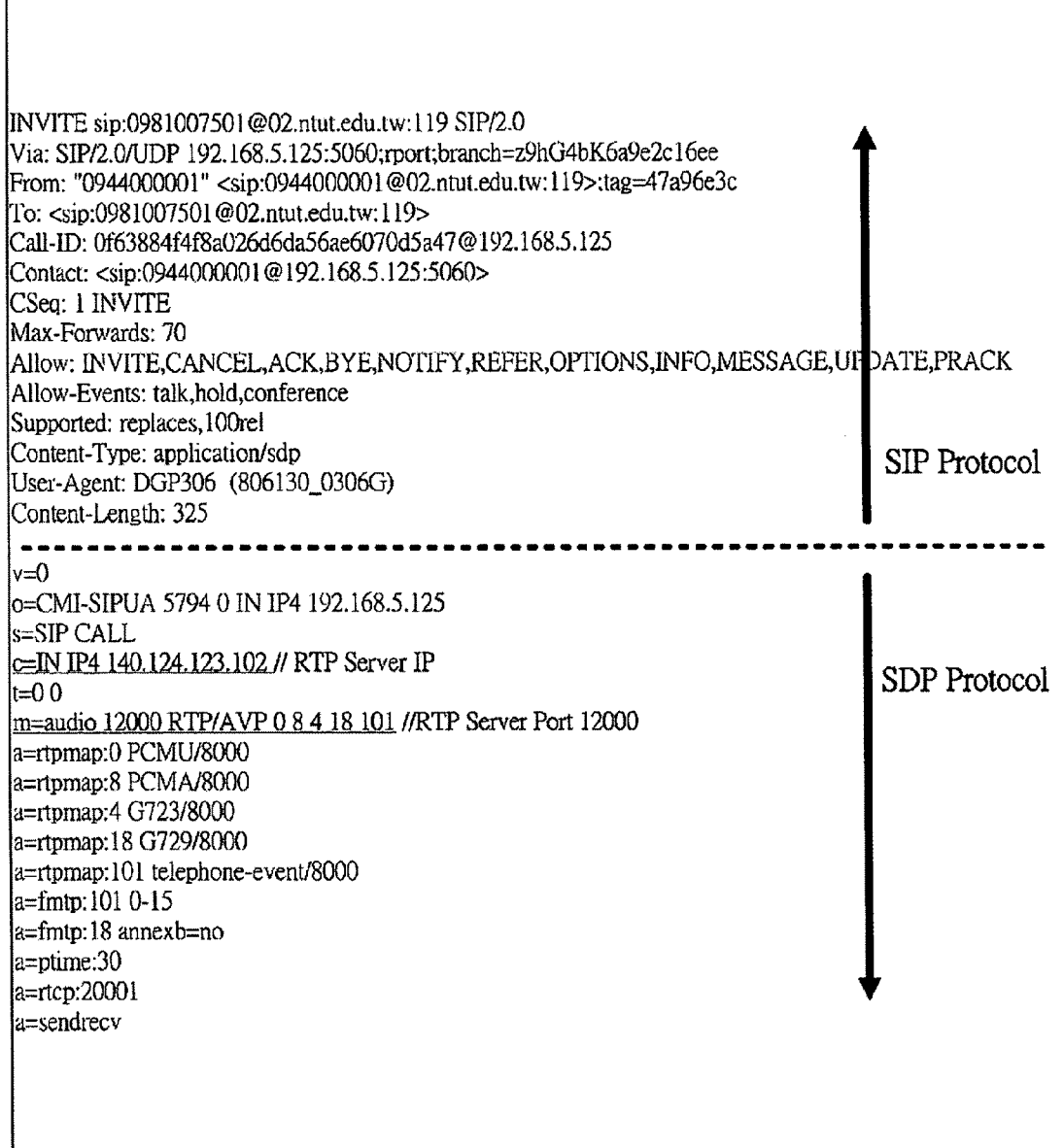
FIG. 4 shows schematically that SIP and SDP parts are separated apparently.

The SIP includes Session Description Protocol (SDP). SDP comprises compressive and decompressive forms which are needed for transferring speech packets. In FIG. 4, SIP and SDP parts are separated apparently, "c" message in SDP represents IP of the source terminal for speech packet, "m" represents port number of the source terminal for speech packet.

Figure 5:
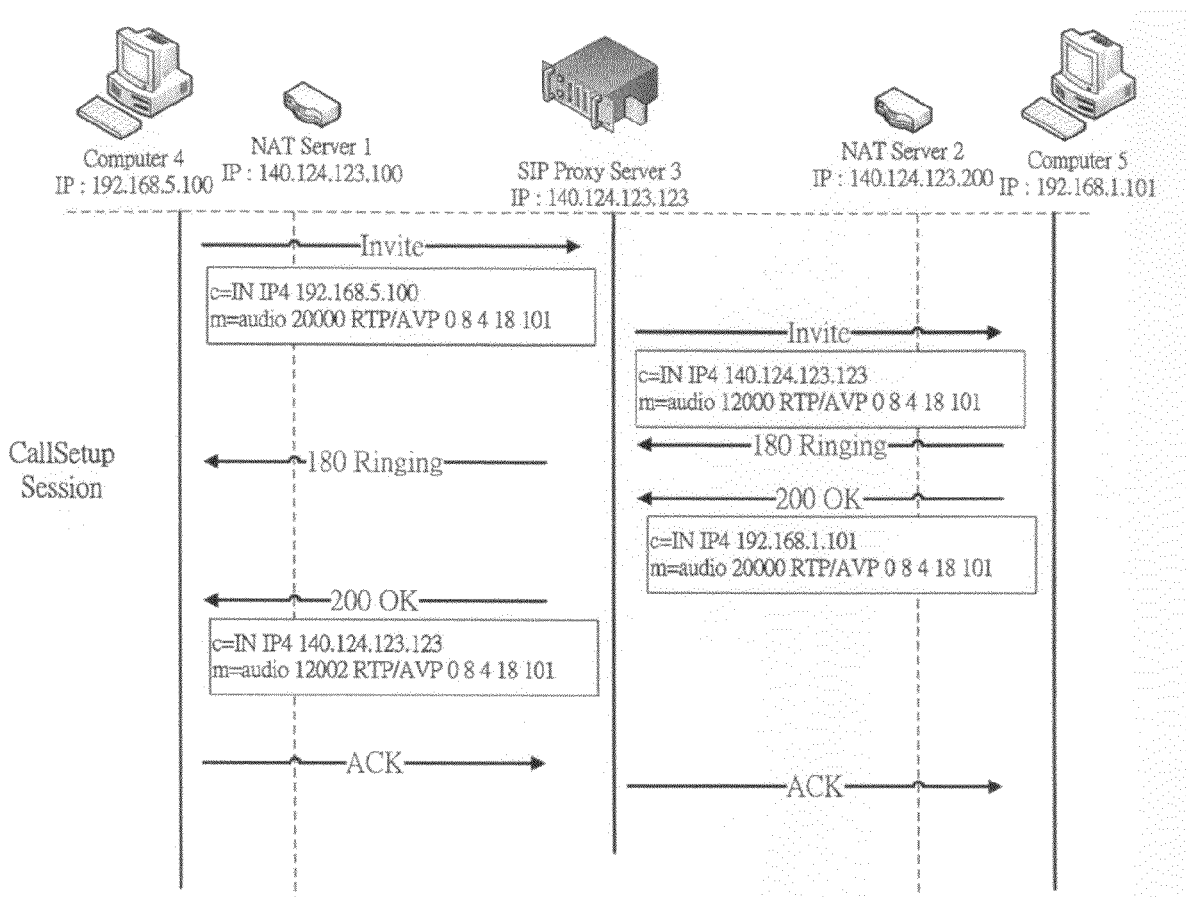
FIG. 5 shows the procedure to set up communication in standard SIP.

Referring to FIG. 5, which is the procedure to set up communication in standard SIP. The computer 4 issues Invite message to SIP proxy server 3, Invite message comprises SDP messages as below:
   c=IN IP4 192.168.5.100
   m=audio 20000 RTP/AVP 0 8 4 18 101
after the Invite message passes through the SIP proxy server 3, it will be modified as:
   c=IN IP4 140.124.123.123
   m=audio 12000 RTP/AVP 0 8 4 18 101
The above messages will then pass through NAT server 2 to reach the computer 5. After the computer 5 receives the Invite message, it will return with "200 OK" to the SIP proxy server 3. The 200 OK message comprises:
   c=IN IP4 192.168.1.101
   m=audio 20000 RTP/AVP 0 8 4 18 101
After the computer 5 receives the Invite message, it will then transfer speech packets to RTP server (i.e. SIP proxy server 3) with IP:
140.124.123.123 and port number 12000.

After the SIP proxy server 3 receives 200 OK message, it will modifies "c" and "m" as:
   c=IN IP4 140.124.123.123
   m=audio 12002 RTP/AVP 0 8 4 18 101
and transfer to the computer 4 through NAT server 1. After the computer 4 receives 200 OK message, it will transfer speech packets to RTP server (i.e. SIP proxy server 3) with IP: 140.124.123.123 and port number 12002. RTP server (i.e. SIP proxy server 3) receives speech packets from both sides, and transfer speech packets to the other side.

Nat Traversal Method in Session Initiation Protocol

Embodiment 1

Figure 6:
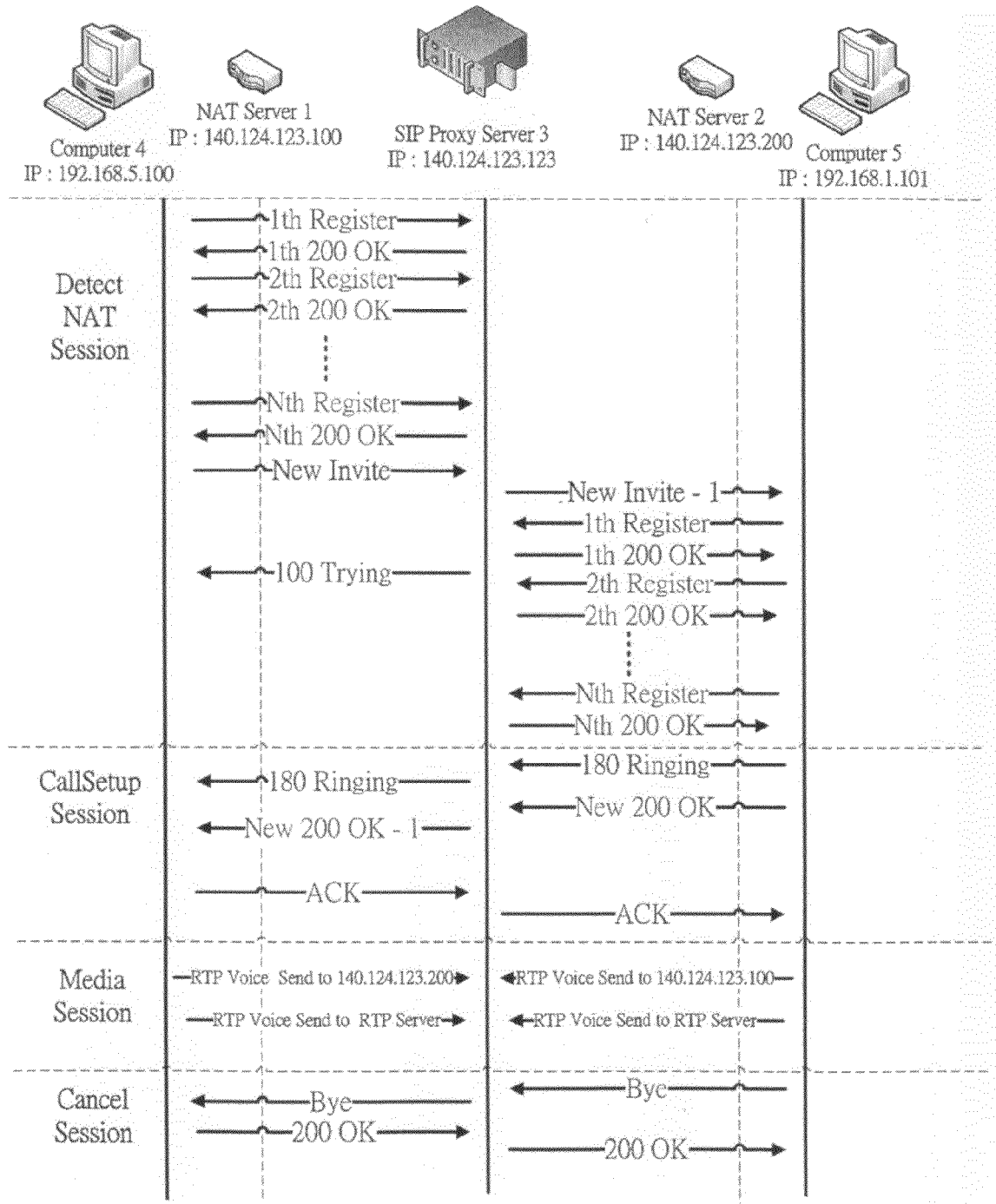
FIG. 6 shows the NAT traversal method in Session Initiation Protocol according to the present invention.

Referring to FIG. 6, the NAT traversal method in Session Initiation Protocol according to the present invention is described.

In FIG. 6, New Invite, New Invite-1, New 200 OK and New 200 OK-1 are modified messages for explanation, in real SIP communication system, only Invite and 200 OK messages are used.

Before the computer 4 issues Invite message, a plurality of registrations (N registrations) are conducted (in FIG. 3, the prior art only conduct one registration) in order to detect the rule of the NAT server 1 to assign port numbers. In the present invention, a registration is also referred to as a detection. After the N registrations, the computer 4 will predict the port number assigned by the NAT server 1 during speech packets transferring by the rule of the NAT server 1 to assign port numbers, and fill the IP of the NAT server 1 and the port number assigned to the computer 4 to transfer speech packets into the SDP part in New Invite message: (please also see FIG. 7)
   c=IN IP4 140.124.123.100
   m=audio 10079 RTP/AVP 0 8 4 18 101
New Invite message passes through NAT server 1 to the SIP proxy server 3, and the SIP proxy server 3 passes the New Invite message through NAT server 2 to the computer 5. When the New Invite message passes through the SIP proxy server 3, the SIP proxy server 3 will add "c" and "m" of the RTP server (SIP proxy server 3) together with the "c" and "m" of NAT server 1 to form New Invite-1 message. This action will result in a two-way communication, i.e. communication can be conducted by NAT server 1 or by RTP server (SIP proxy server 3) so as to enhance the put through rate. When the prediction of the port number assigned by the NAT server 1 to transfer speech packets is wrong, the communication can be assisted by the RTP server (SIP proxy server 3). New Invite-1 message is as below:
   c=IN IP4 140.124.123.123
   c=IN IP4 140.124.123.100
   m=audio 12000 RTP/AVP 0 8 4 18 101
   m=audio 10079 RTP/AVP 0 8 4 18 101
After the computer 5 receives New Invite-1 message, it will conduct a plurality of registrations (N registrations) (in FIG. 3, the prior art only conduct one registration) in order to detect the rule of the NAT server 2 to assign port numbers. After the N registrations, the computer 5 will predict the port number assigned by the NAT server 2 to the computer 5 for speech packets transferring, and fill the IP of the NAT server 2 and the port number assigned to the computer 5 to transfer speech packets into the SDP part in New 200 OK message as below:
   c=IN IP4 140.124.123.200
   m=audio 30083 RTP/AVP 0 8 4 18 101
The computer 5 then passes New 200 OK message through NAT server 2 to SIP proxy server 3, SIP proxy server 3 will then pass the message through NAT server 1 to the computer 4. When the message passes through the SIP proxy server 3, the SIP proxy server 3 will add "c" and "m" of the RTP server (SIP proxy server 3) together with the "c" and "m" of NAT server 2 to form New 200 OK-1 message. This action will result in a two-way communication, i.e. communication can be conducted by NAT server 2 or by RTP server (SIP proxy server 3) so as to enhance the put through rate. When the prediction of the port number assigned by the NAT server 2 to transfer speech packets is wrong, the communication can be assisted by the RTP server (SIP proxy server 3). New 200 OK-1 message is as below:
   c=IN IP4 140.124.123.123
   c=IN IP4 140.124.123.200
   m=audio 12002 RTP/AVP 0 8 4 18 101
   m=audio 30083 RTP/AVP 0 8 4 18 101
After the computer 4 receives NEW 200 OK-1 message, it will return with an ACK message to the computer 5, and prepare to transfer speech packets. After the computer 4 issues the ACK message, the communication procedure will enter Media Session, the computer 4 will transfer the speech packets to port number 30083 of the NAT server 2 and port number 12002 of the RTP server simultaneously. After the computer 5 receives the ACK message, it will transfer the speech packets to port number 10079 of the NAT server 1 and port number 12000 of the RTP server simultaneously. If the predictions of the port number for both sides are correct, the speech packets will be transferred directly between NAT server 1 and NAT server 2, and stop transferring of the speech packets to the RTP server (SIP proxy server), thus achieving the object of the present invention, i.e. speech packets go directly by peer to peer transmission without SIP proxy server. However, if the prediction of the port number for either NAT server 1 or NAT server 2 is wrong so that the either the computer 4 or the computer 5 does not receive the speech packets, then the computer 4 and the computer 5 will stop the speech packets transmission with each other, and both transfer the speech packets to the RTP server (SIP proxy server 3) in order to establish the speech communication.

Figure 7:
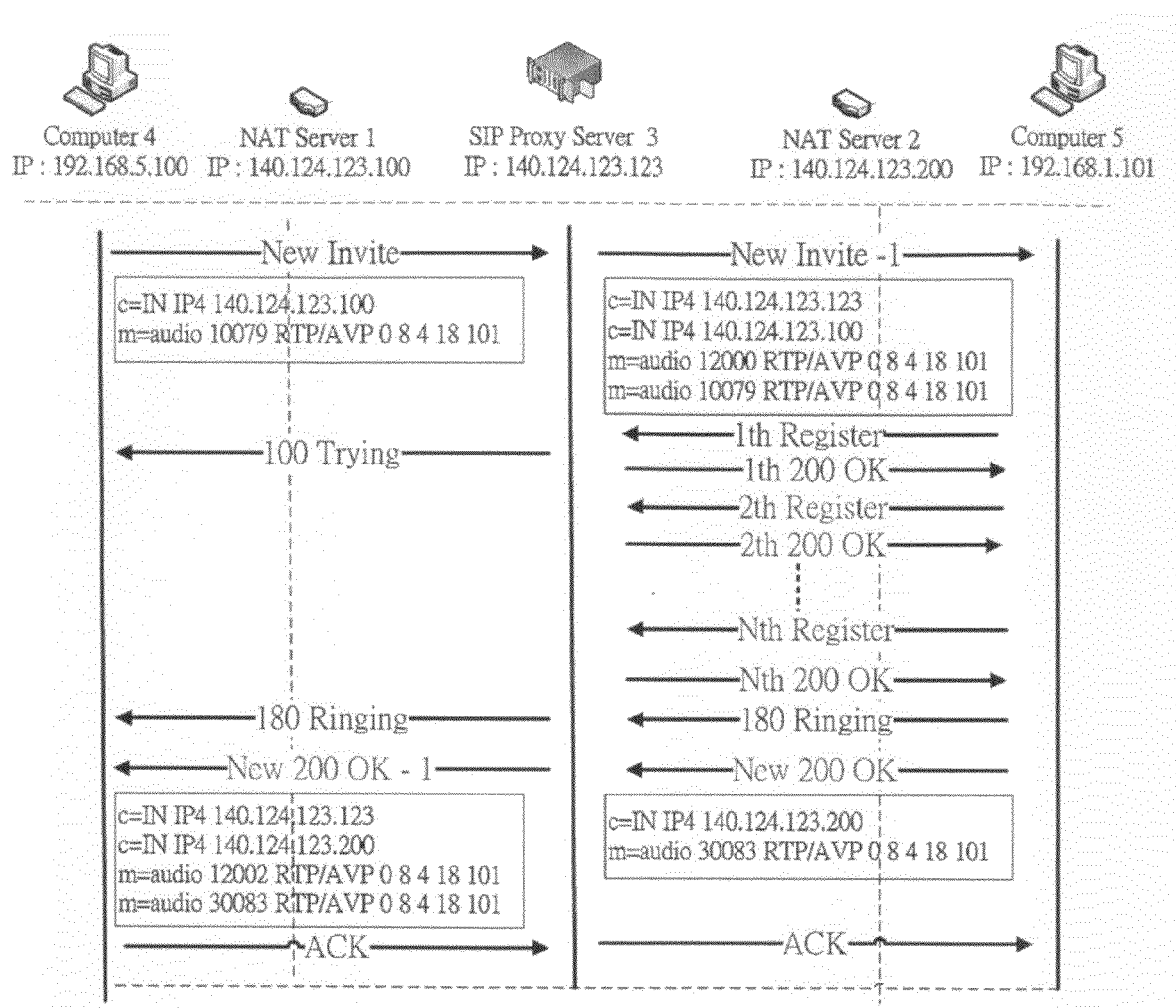
FIG. 7 shows the schematic diagram of the New Invite, New Invite-1, New 200 OK and New 200 OK-1.

FIG. 7 shows the schematic diagram of the New Invite, New Invite-1, New 200 OK and New 200 OK-1.

Figure 8:
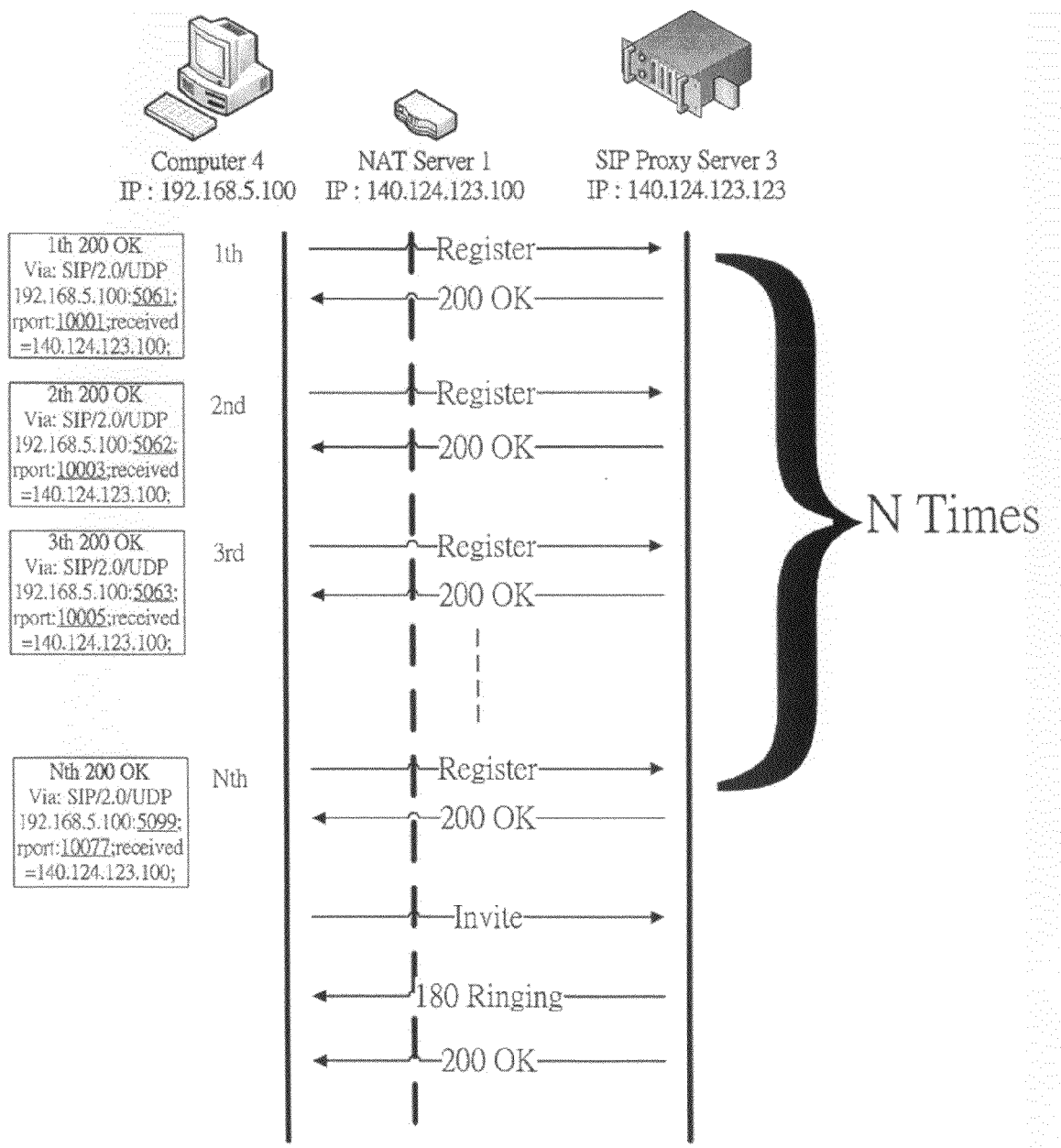
FIG. 8 shows the plurality of detections (N detections) according to the present invention in order to detect the rule of the NAT server to assign port numbers.

The plurality registrations (N registrations) of the computer 4 in FIG. 6 in order to detect the rule of the NAT server 1 to assign port numbers is described in FIG. 8. Please view the left blocks in FIG. 8, the computer 4 first uses port number 5061 to transfer registration message to SIP Proxy server 3 through NAT server 1. From the return message of the SIP proxy server 3, NAT server 1 changes the port number 5061 of the computer 4 to 10001. Secondly, the computer 4 uses port number 5062 to transfer registration message to SIP Proxy server 3 through NAT server 1. From the return message of the SIP proxy server 3, NAT server 1 changes the port number 5062 of the computer 4 to 10003. Up to N times, the computer 4 uses port number 5099 to transfer registration message to SIP Proxy server 3 through NAT server 1. From the return message of the SIP proxy server 3, NAT server 1 changes the port number 5099 of the computer 4 to 10077. It is found that the rule of the NAT server 1 to assign port number is by increasing 2, therefore it is predicted that NAT server 1 will assign port number 10079 to the computer 4 to transfer the speech packets.

Embodiment 2

Besides the plurality registrations (N registrations) of the computer 4 in FIG. 6 in order to detect the rule of the NAT server 1 to assign port numbers, there is another detecting method by utilizing Option and 200 OK messages.

The computer 4 utilizes Option and 200 OK messages to conduct a plurality of detections (N detections) before issuing the Invite instruction.

First the computer 4 uses port number 5060 to transfer Option message to SIP proxy server 3 through NAT server 1, and then SIP proxy server 3 transfer 200 OK message to the computer 4 through NAT server 1. The IP of NAT server 1 and the port number used by NAT server 1 for transferring Option massage is filled into the 200 OK message by the SIP proxy server 3. After the computer 4 receives the 200 OK message, it will conduct the second detection.

In the second detection, the computer 4 uses port number 5061 to transfer Option message to SIP Proxy server 3 through NAT server 1, and then SIP proxy server 3 transfer 200 OK message to the computer 4 through NAT server 1. The IP of NAT server 1 and the port number used secondly by NAT server 1 for transferring Option massage is filled into the 200 OK message by the SIP proxy server 3. After the computer 4 receives the 200 OK message, it will conduct the third detection.

After a plurality of detections (N detectins), the computer 4 will realize the rule that NAT server 1 assigns the port number, and then predict the port number which will be assigned by the NAT server 1 to the computer 4 for transferring the speech packets in accordance with the rule. The predicted port number of NAT server 1 and the IP of NAT server 1 will be filled into the Invite instruction for transferring to the computer 5. Similarly, the computer 5 will also use Option and 200 OK messages for conducting a plurality of detections (N detections) after receive the Invite message, and then predict the port number that NAT server 2 will assign to the computer 5. The IP of NAT server 2 and the predicted port number assigned to the computer 5 will be filled into the 200 OK message for transferring to the computer 4 through SIP proxy server 3. After the computer 4 receives the 200 OK message, the computer 4 and the computer 5 will transfer speech packets to NAT server 2 and NAT server 1 as well as to SIP proxy server 3. If one of the predictions is wrong, the computer 4 and the computer 5 will stop transferring to NAT server 2 and NAT server 1, and use SIP proxy server for communication.

Furthermore, other self-designed message can also be used for cooperating with SIP proxy server 3 to conduct the similar operations. SIP proxy server 3 informs the computer 4 the port number assigned by NAT server 1. After a plurality of detections (N detections) the computer 4 will realize the rule that NAT server 1 assigns the port number, and predict the future port number assigned by the NAT server 1. The IP and the predicted port number of NAT server 1 will be filled into the Invite message by the computer 4 for transferring to the computer 5 through SIP proxy server 3. Similarly, after the computer 5 receives the Invite message, the self-designed message can also be used for cooperating with SIP proxy server 3 to conduct a plurality of detections (N detections), and transfer 200 OK or the self-designed message to the computer 4 through SIP Proxy server 3. The computer 4 and the computer 5 will then use the predicted port numbers for conducting P2P (Peer to Peer) communication. If one of the predictions is wrong, the computer 4 and the computer 5 will stop the transferring to NAT server 2 and NAT server 1, and use SIP proxy server 3 for communication.

The scope of the present invention depends upon the following claims, and is not limited by the above embodiments.

What is claimed is:

1. An NAT (Network Address Translator) traversal method in Session Initiation Protocol (SIP), the Session Initiation Protocol (SIP) includes a Login Session, a Call Setup Session, a Media Session and a Cancel Session, and comprises a first NAT server, a second NAT server and an SIP proxy server, a first computer is under the first NAT server, a second computer is under the second NAT server; the SIP proxy server also performs a function of an RTP (Real Time Transport Protocol) server, the SIP proxy server is responsible for transferring messages, while the RTP server is responsible for transferring speech packets, the method comprises the steps as below:

a. the first computer uses a "Register" request of the SIP to conduct a plurality of registrations before issuing an Invite message in the Login Session for detecting a rule that the first NAT server assigns a port number and an IP address;

for each registration the SIP Proxy server will return a 200 OK message that includes a "rport" parameter for reporting the port number assigned by the first NAT server and a "received" parameter for reporting the IP address assigned by the first NAT server;

b. after the plurality of registrations the first computer predicts the port number and the IP address assigned by the first NAT server in accordance with the rule that the first NAT server assigns a port number and an IP address for transferring speech packets, and the predictive IP address of the first NAT server and port number assigned by the first NAT server to the first computer for transferring speech packets are filled into a parameter "c=IN IP4" and a parameter "m=audio" of the Invite message;

c. the invite message passes to the SIP proxy server through the first NAT server, the SIP proxy server adds an IP of the RTP server and a port number of the RTP server to the invite message, and then passes the invite message to the second computer through the second NAT server;

d. after the second computer receives the Invite message, the second computer uses the "Register" request in SIP to conduct a plurality of registrations for detecting a rule that the second NAT server assigns a port number and an IP address;

for each registration the SIP Proxy server will return a 200 OK message that includes a "rport" parameter for reporting the port number assigned by the second NAT server and a "received" parameter for reporting the IP address assigned by the second NAT server;

e. after the plurality of registrations, the second computer predicts the port number and IP address assigned by the second NAT server to the second computer for transferring speech packets, and the predictive IP address of the second NAT server and the port number assigned by the second NAT server to the second computer for transferring speech packets are filled into a parameter "c=IN IP4" and a parameter "m=audio" of a 200 OK message respectively;

f. the second computer passes the 200 OK message to the SIP proxy server through the second NAT server, the SIP proxy server adds the IP of the RTP server and the port number of the RTP server to the 200 OK message, and then passes the 200 OK message to the first computer through the first NAT server;

g. after the first computer receives the 200 OK message, returns an ACK message to the second computer, and then enter the Media Session, the first computer passes speech packets to both the second NAT server and the RTP server through the first NAT server;

h. after the second computer receives the ACK message, the second computer passes speech packets to both the first NAT server and the RTP server through the second NAT server;

i. if the prediction of the port numbers assigned by the first NAT server and the second NAT server to the first computer and the second computer are correct, the speech packets will be transferred directly between the first NAT server and the second NAT server, and stopped to transfer to the SIP proxy server;

j. if the prediction of the port numbers assigned by the first NAT server and the second NAT server to the first computer and the second computer are wrong so that the first computer and the second computer do not receive the speech packets from the second computer and the first computer, the first computer and the second computer will stop the speech packets transferring directly between the first NAT server and the second NAT server, but transfer the speech packets to the SIP proxy server through the first NAT server and the second NAT server respectively to set up communication by the SIP proxy server.

* * * * *